United States Patent
Penaloza et al.

(10) Patent No.: US 6,973,947 B2
(45) Date of Patent: Dec. 13, 2005

(54) TRACTOR WITH INTEGRATED CAB FLOOR FUEL TANK

(75) Inventors: Joseph T. Penaloza, Fort Wayne, IN (US); Rodney J. Klinger, Fort Wayne, IN (US); James C. Bradley, New Haven, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 122 days.

(21) Appl. No.: 10/721,665

(22) Filed: Nov. 25, 2003

(65) Prior Publication Data

US 2005/0109773 A1    May 26, 2005

(51) Int. Cl.[7] ............................................... B65B 1/04
(52) U.S. Cl. ........................ 141/286; 141/86; 141/32; 141/311 A
(58) Field of Search ..................... 141/286, 86, 32, 141/311 A; 220/564, 4.14; 137/260

(56) References Cited

U.S. PATENT DOCUMENTS

| | | | | |
|---|---|---|---|---|
| 2,533,431 A | * | 12/1950 | Chausson | 220/4.14 |
| 4,013,190 A | * | 3/1977 | Wiggins et al. | 220/563 |
| 5,547,096 A | * | 8/1996 | Kleyn | 220/4.14 |

FOREIGN PATENT DOCUMENTS

EP        0348383 A2 * 12/1989   .......... B60K 15/00

* cited by examiner

Primary Examiner—Khoa D. Huynh
(74) Attorney, Agent, or Firm—Jeffrey P. Calfa; Dennis Kelly Sullivan; Susan L. Lukasik

(57) ABSTRACT

A combination fuel tank and cab floor for a truck tractor utilizes a deck plate over a multi-reservoir base pan. The pan is configured both to divide the fuel storage area and to provide a frame for supporting seats and bunks to be installed on the floor.

12 Claims, 11 Drawing Sheets

FRONT OF VEHICLE

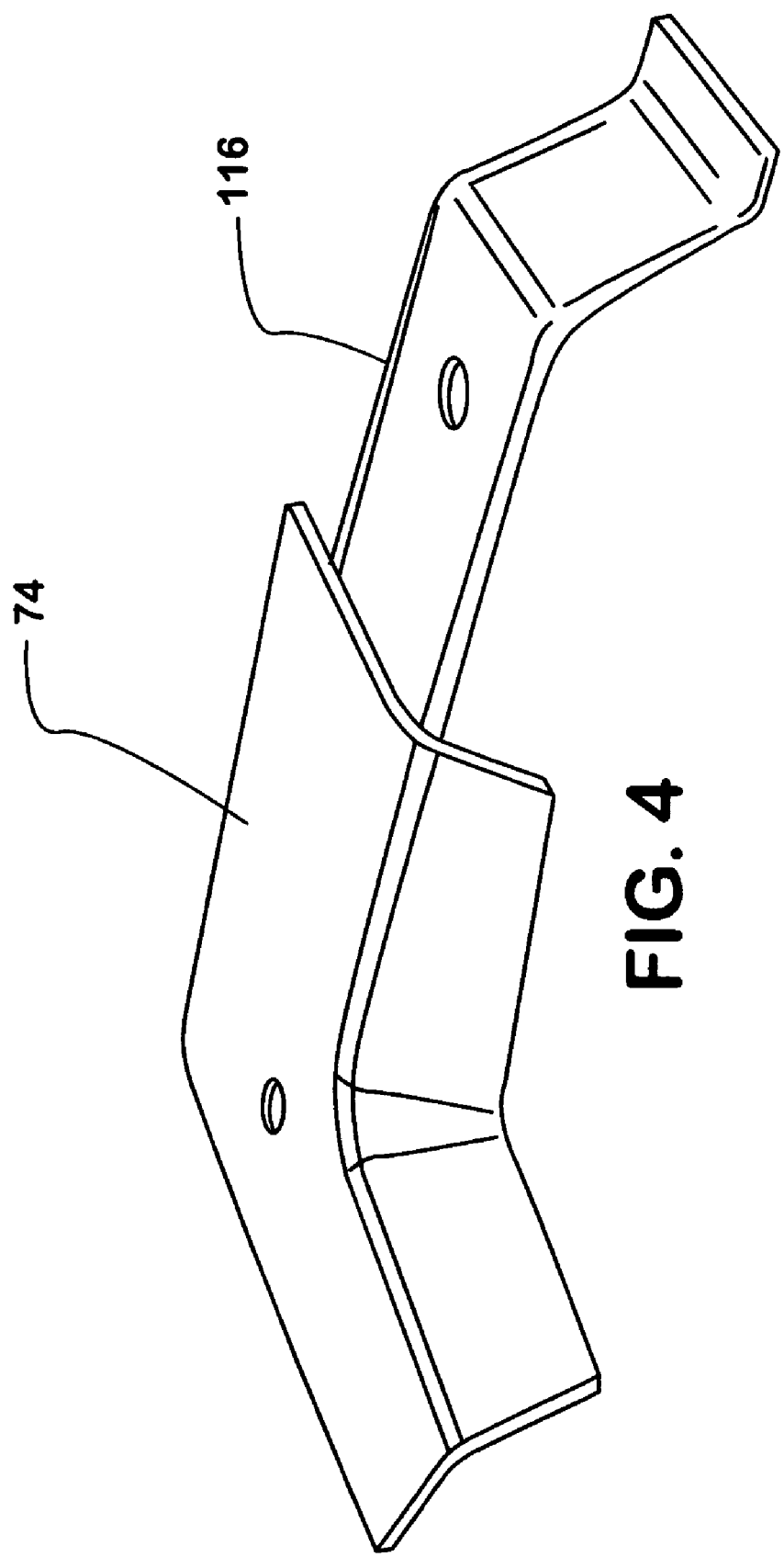

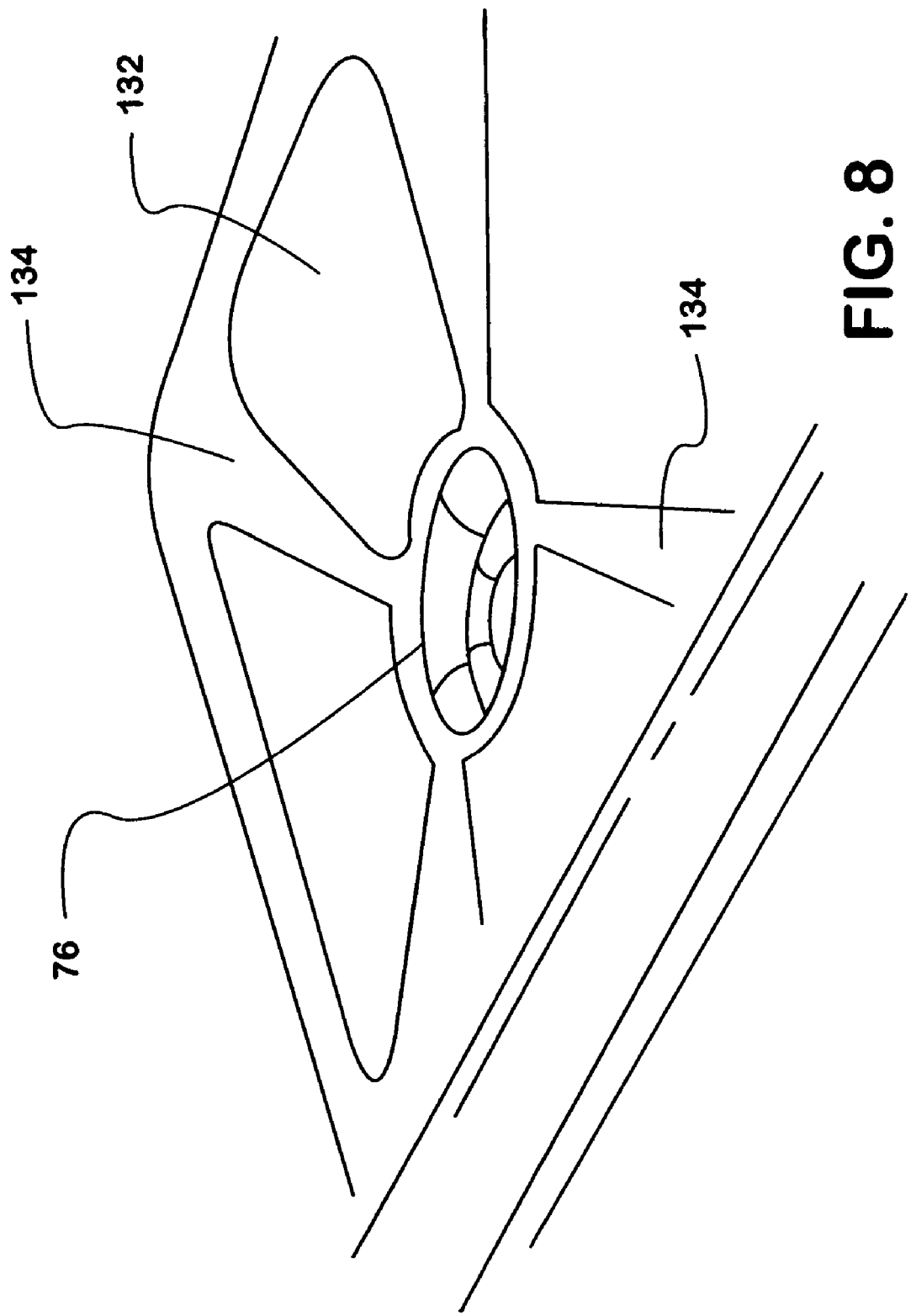

US 6,973,947 B2

TRACTOR WITH INTEGRATED CAB FLOOR FUEL TANK

BACKGROUND OF THE INVENTION

1. Technical Field

The invention relates to motor vehicle fuel storage systems and more particularly to a fuel tank directed to reducing fuel starvation and sloshing problems.

2. Description of the Problem

Over the road truck tractors have conventionally carried their fuel supply in two cylindrical tanks which are hung, one each, to the outside of the vehicle frame, low on the vehicles' frame rails. This arrangement is referred to as a dual draw tank system. Dual draw tank systems present a number of problems relating to fuel delivery to the vehicle's engine and to vehicle stability.

The use of dual draw tanks can result in uneven fuel draw into the engine since each tank is drawn from independently. Uneven fuel draw can result in differences in the fuel levels in the tanks. Differing fuel levels in the tanks usually means that the tractor is differentially loaded from side to side and this can affect cornering stability. The difference in fuel level may be difficult to ascertain as well. Also, as the tanks are drained, the fuel remaining in the tanks becomes prone to sloshing back and forth, which can affect stopping and acceleration, ride and handling performance. Fuel sloshing has in the past been partially dealt with by incorporating baffles in the fuel tank.

Cylindrical fuel tanks are, despite various efforts to correct the problem, prone to rotation. This may stem over the long term from vehicle vibration. Tank rotation can require expensive repair. Cylindrical fuel tanks have not been consistently located on trucks, resulting in the need to provide numerous alternative support arrangements for other equipment on truck tractors, such as battery boxes and tool boxes.

SUMMARY OF THE INVENTION

According to the invention there is provided a vehicle substructure comprising a floor section and a support frame disposed beneath and adjacent to the floor section, the support frame including a stamping having a raised, rectangular perimeter wall with an upper edge in contact with the floor section and a plurality of support ribs within the raised, rectangular perimeter wall each of which are orthogonal with respect to a side thereof. Reservoirs are formed in the stamping between and defined by the ribs, the raised, rectangular perimeter wall and a base from which the raised, rectangular perimeter wall and the ribs rise. Channels are located through the dikes to interconnect the reservoirs into a single fuel tank.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a perspective view of the edge rim of the cab floor fuel tank pan of FIG. 3.

FIG. 8 is a perspective view of a pan drain.

DETAILED DESCRIPTION OF THE INVENTION

Figure 1:
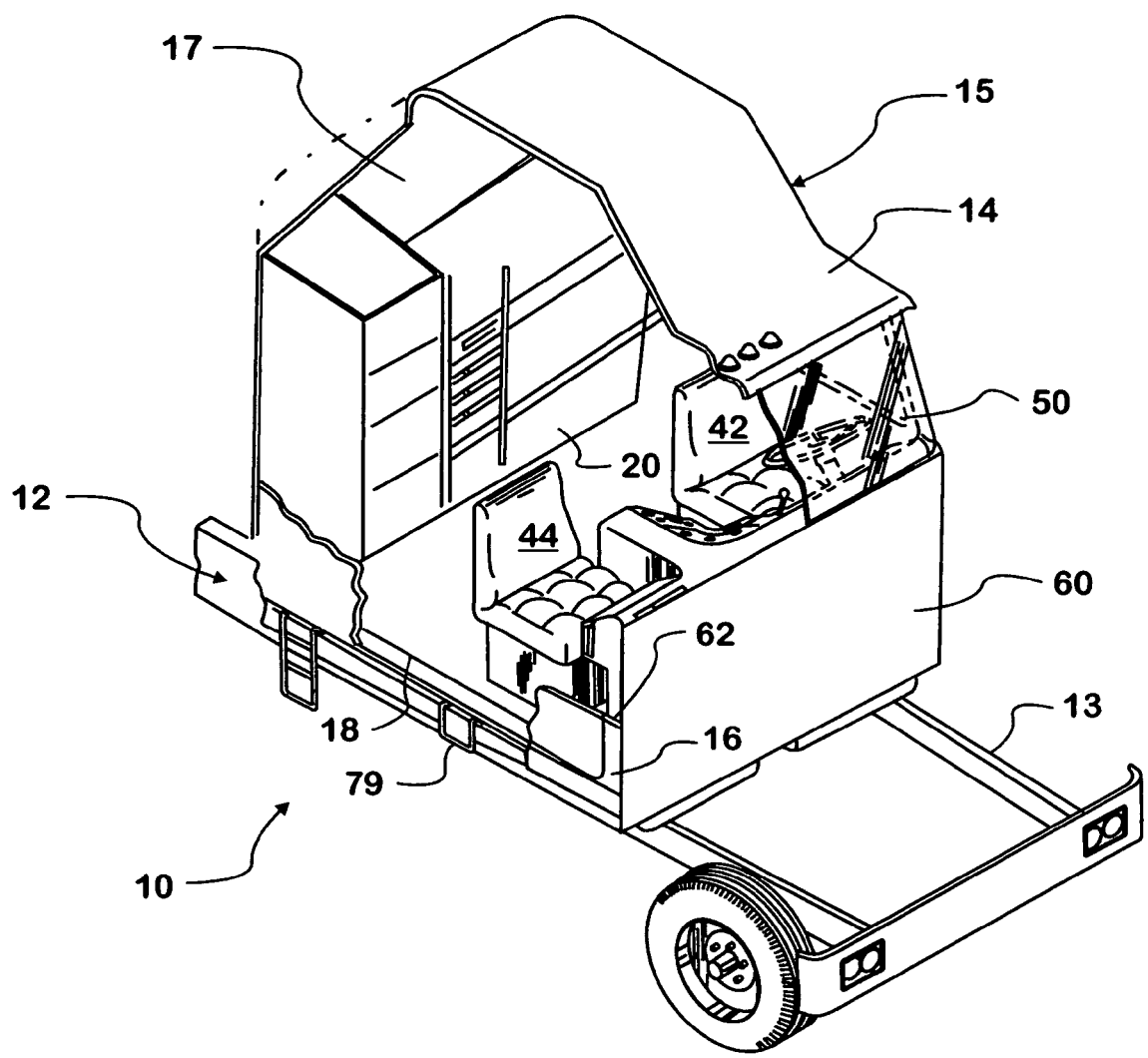
FIG. 1 is a perspective view in partial cutaway of a truck tractor with an integrated cab floor fuel tank.

Referring now to the figures and in particular to FIG. 1, a tractor 10 is illustrated incorporating the integrated cab floor fuel tank 18 of the invention. Tractor 10 is constructed on two longitudinally aligned frame rails 12 and 13. Integrated cab floor fuel tank 18 is disposed between the remainder of cab 15 and the frame rails 12 and 13. Cab 15 is defined by a passenger side side wall 16, a forward dash panel 60, a driver side side wall 50, a back wall 17, a roof 14 and integrated cab floor fuel tank 18 located at the bottom of the cab. Cab floor fuel tank 18 supports several features of the cab including driver and passenger seats 42 and 44, and a rear bunk 20, all of which are mounted to the cab floor fuel tank.

Figure 2:
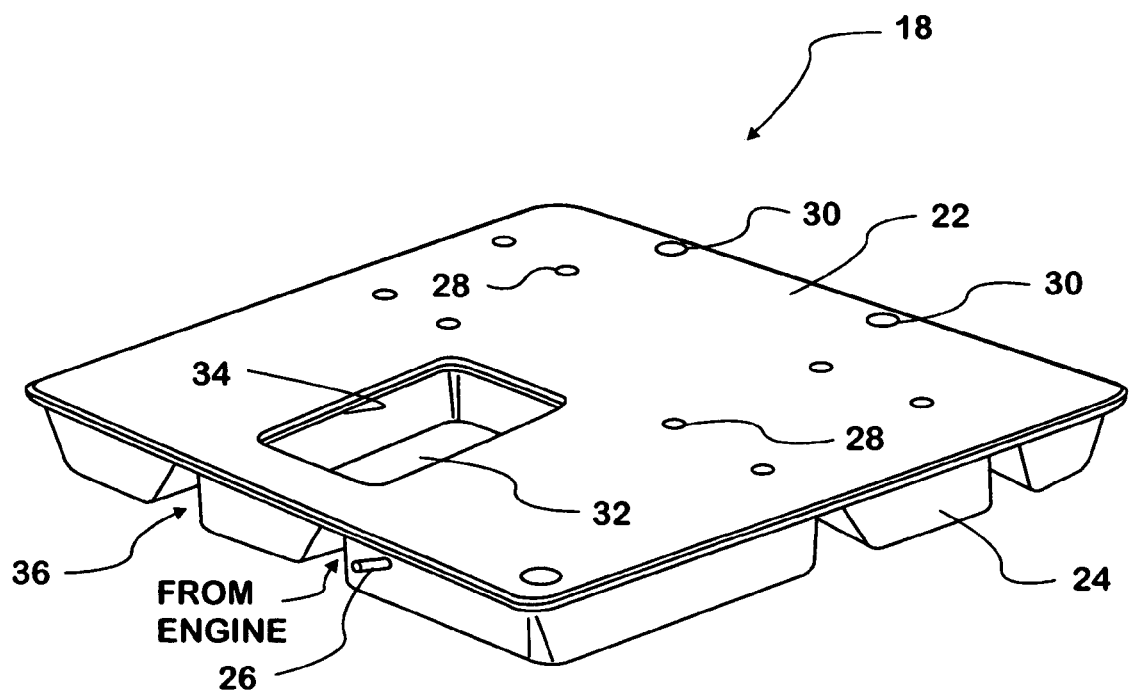
FIG. 2 is a perspective view of the cab floor fuel tank of the present invention.

Integrated cab floor and fuel tank 18 is illustrated in isolation in FIG. 2. Cab floor/fuel tank 18 comprises a floor section or deck 22 and a pan 24. Deck 22 provides the upper portion of cab floor/fuel tank 18 and has an upper surface exposed to the truck interior on which vehicle occupants can walk and which faces the supports for objects such as seats and bunks. Support and attachment points 28 are provided distributed around the deck 22. In a normal application deck 22 is generally rectangular. A opening 34 is provided through deck 22 toward the forward edge of the deck, allowing access to a void 32. Void 32 is intended to provide space for installation of a transmission linkage if required for a vehicle with a manual transmission.

The lower section of cab floor/fuel tank 18 is provided by pan 24, which provides a plurality of reservoirs for fuel storage. A fuel return line 26 from a vehicle engine is provided into pan 24 along the forward edge of the pan. Front cab mounting points 36 and rear cab mounts 30 are also provided along the forward and trailing edges of deck 22, respectively.

Figure 3A:
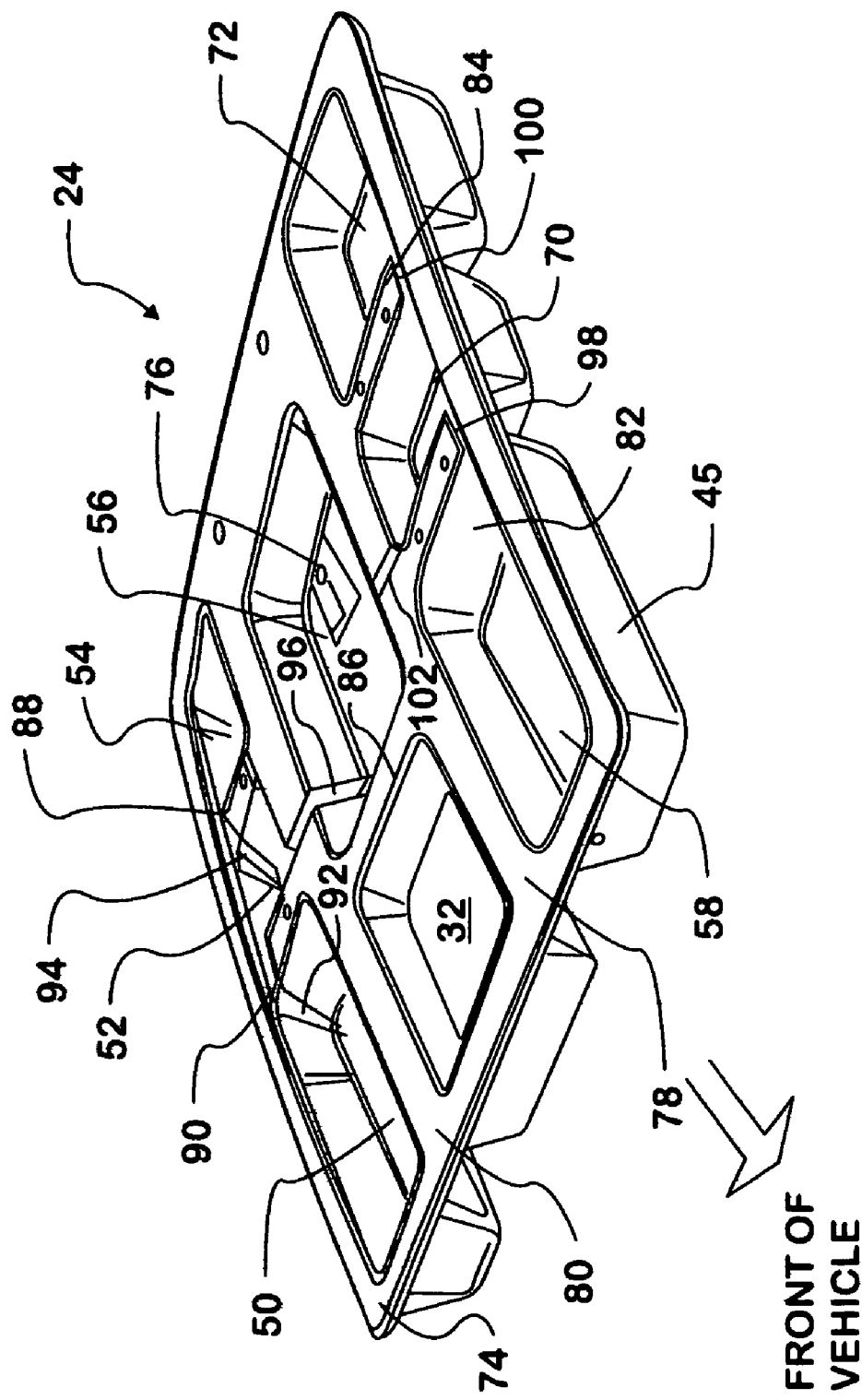
FIGS. 3A–B illustrate fuel tank pan for the integrated cab floor fuel tank.

FIGS. 3A and B illustrate pan 24 for integrated cab floor/fuel tank 18 in greater detail. Pan 24 is preferably a single piece, steel stamping, and may be viewed as having a plurality of depressions, most of which are utilized as fuel reservoirs 50, 52, 54, 56, 58, 70 and 72. Void 32 is included among the depression, but is reserved for providing space for the shift linkage for a standard transmission. Separating depressions 32, 50, 52, 54, 56, 58, 70 and 72 are a plurality of raised rails or dikes 78, 80, 82, 84, 86, 88 and 90. Dikes 78, 80, 82, 84, 86, 88 and 90 are oriented either longitudinally (dikes 78 and 80) or latitudinally (the remainder) and are situated to replace a skeletal frame which supports permanent cab furnishings, e.g. seats, bunks, etc.

Depressions 50, 52, 54, 56, 58, 70 and 72 intended for fuel storage are interconnected to one another by a series of channels or gaps 92, 94, 96, 98, 100 and 102 left in dikes 78, 80, 82, 84, 86, 88 and 90. Channels 92, 94, 96, 98, 100 allow fuel to flow from one reservoir to an adjacent reservoir. Each of depressions 50, 52, 54, 56, 58, 70 and 72 intended for fuel storage is connected by at least one channel to an adjacent depression. The positions shown for channels 92, 94, 96, 98, 100 are preferably selected to assure that fuel eventually drains to depression 56, from which fuel is drawn through a drain 76. Depression 56 is located centrally from side to side of pan 24 and toward the back of the pan. In order to assure that fuel eventually drains to depression 56 the rear end of pan 24 is slightly lower than the forward end of the pan. Alternatively, the floors to the fuel storage depressions 50, 52, 54, 56, 58, 70 and 72 may be tilted to achieve the same result. For depressions 58, 72, 50 and 54 which have one outlet each, the floor of the depression should have its lowest point (when the vehicle is level) adjacent channels 98, 100, 90 and 94, respectively. The floors of depressions 70 and 52 should have their lowest points adjacent channels 102 and 96 to depression 56, respectively. Depression 56, which includes drain 76, has the drain as its lowest point. Fuel is of course not limited to flowing in one direction through channels 92, 94, 96, 98, 100. Fuel returned or added to any one of depressions 50, 52, 54, 56, 58, 70 and 72 by a filler pipe or return line flows through the channels into the remaining depressions.

Pan 24 is further provided with a four sided perimeter sill 74 which extends outwardly and horizontally on top of a four sided perimeter wall 45. Perimeter wall 45 may be interrupted at various points by upward breaks associated with various of the dikes 78, 80, 82, 84, 88 and 90. The interior face of perimeter wall 47 forms one or more of the sides of depressions 32, 50, 52, 54, 56, 58, 70 and 72.

Figure 3B:
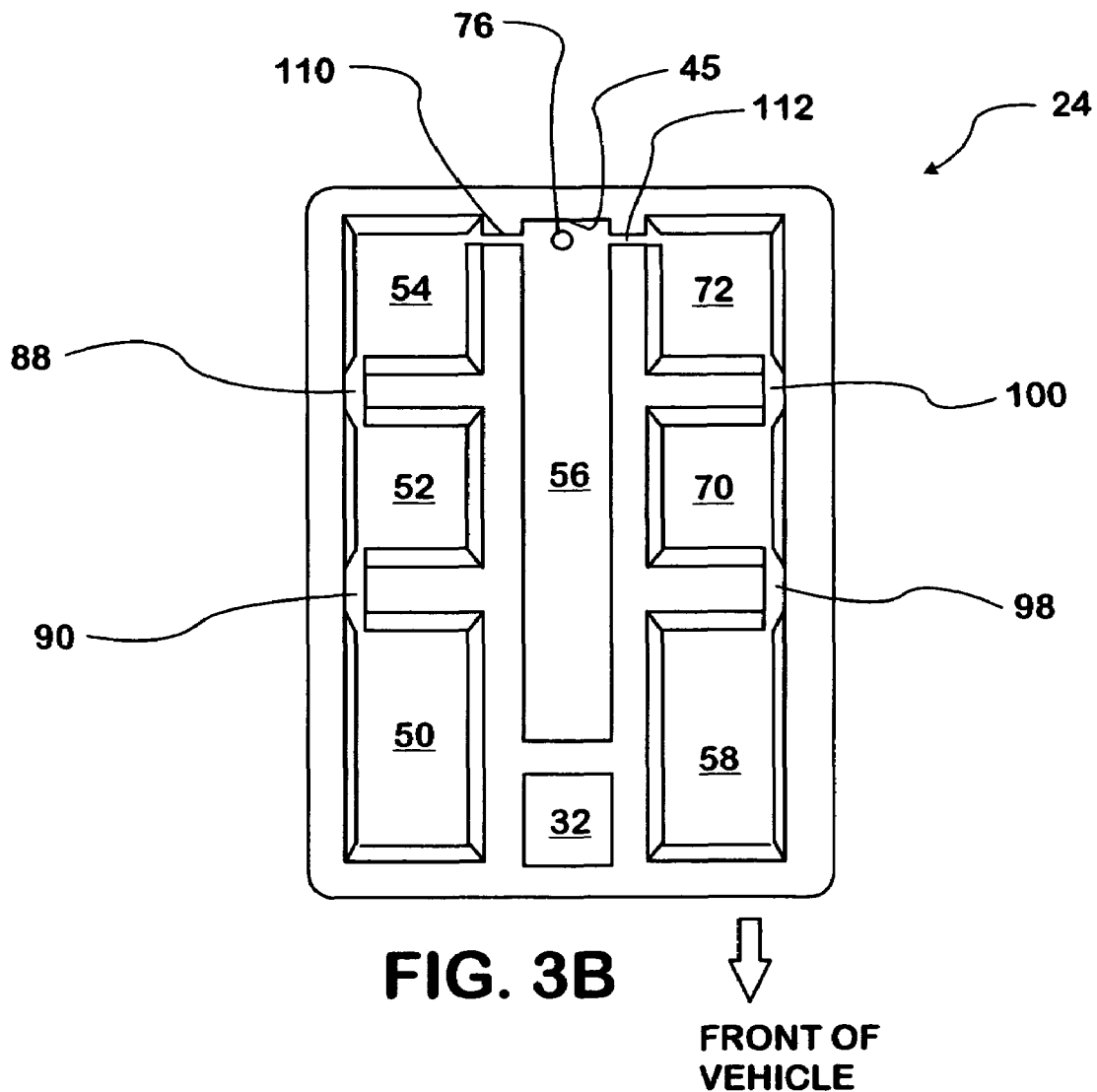

FIG. 3B illustrates one possible arrangement of channels where pan 24 is tilted to lower the rearward edge of the pan. Drain 76 is located adjacent the rearward edge of perimeter wall 45, being substantially co-located with the lowest point in the chain of reservoir depressions 50, 52, 54, 56, 58, 70 and 72. Fuel from Channels 98, 100 and 112 connect depressions 58, 70 and 72 to depression 56 along one side of the vehicle. Channels 90, 88 and 110 connect depressions 50, 52 and 54 to depression 56 along the opposite side of the vehicle.

Figure 6:
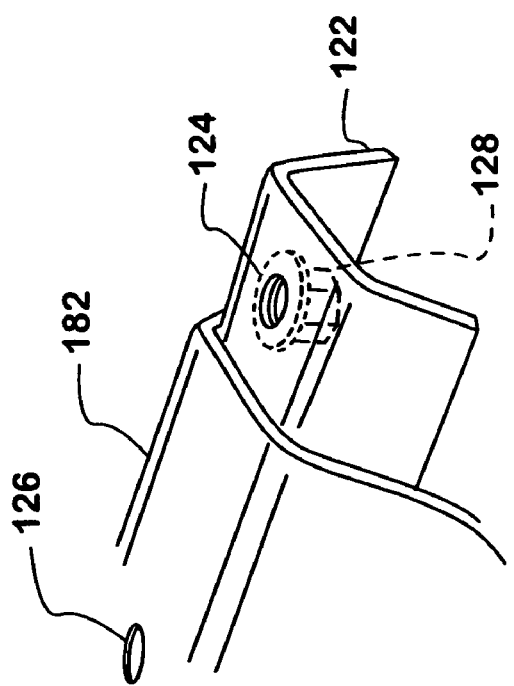
FIG. 6 is a perspective view of a reinforcement bracket undergirding a pan dike.
Figure 5:
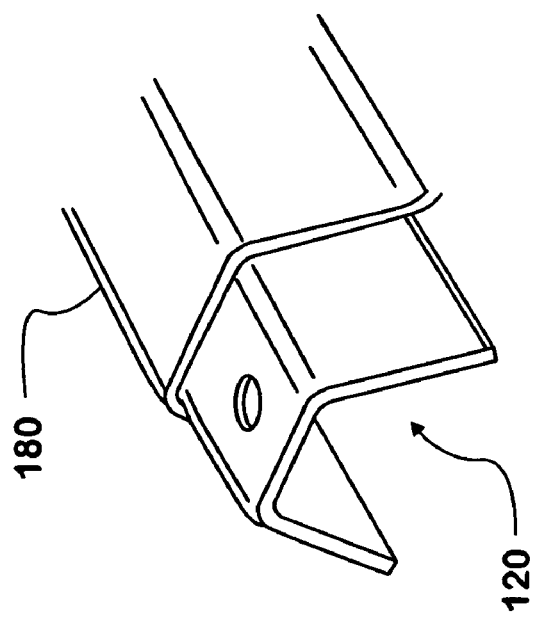
FIG. 5 is a front cab mount support point from the pan.

Referring to FIG. 4 the rear portion of perimeter sill 74 is illustrated in a partial cutaway view to expose a two plane rear sill reinforcement bracket 116 which is nestled up under the perimeter sill. Similarly FIGS. 5 and 6 illustrate the addition of reinforcement channels 120 and 122 to longitudinal and latitudinal dikes 180 and 182. A channel 120 supporting dike 180 provides a front cab mount reinforcement attachment point. Dike 182 and reinforcement channel 122 are representative of the support provided for attachment of a seat and include modifications for installation and support of a seat including a tap hole 126 through dike 182 for insertion of a bolt for securing a seat and tap hole 124 with an associated nut 128 on reinforcement channel 122. Nut 128 is typically welded to the bottom of channel 122. Hole 124 is located axially aligned with a tap hole through dike 182.

Figure 7:
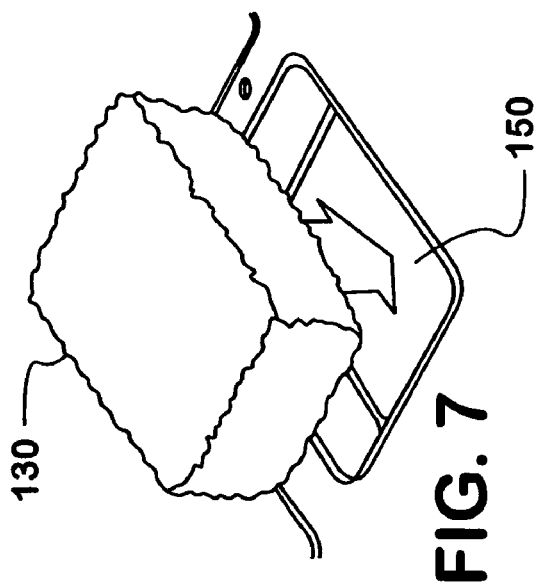
FIG. 7 is a exploded view of a foam filler and pan reservoir combination.

As represented by FIG. 7, fuel depressions 50, 52, 54, 56, 58, 70 and 72 preferably each contain a foam insert such as illustrated by foam insert 130 for an exemplary depression 150. Foam insert 130 is preferably a reticulated polyurethane block marketed as Explosion Suppressant Foam. The material is easily fabricated to conform to the interior shape of most any reservoir. The foam effectively controls fuel surging and sloshing and is available in the United States from Crest Foam Industries, Inc., 100. Carol Place, Moonachie, N.J. 07074.

FIG. 8 illustrates in detail an area surrounding a drain 76 located on the floor 132 of depression 56. Shallow channels 134 in floor 132 focus fuel flow toward drain 76.

Figure 9:
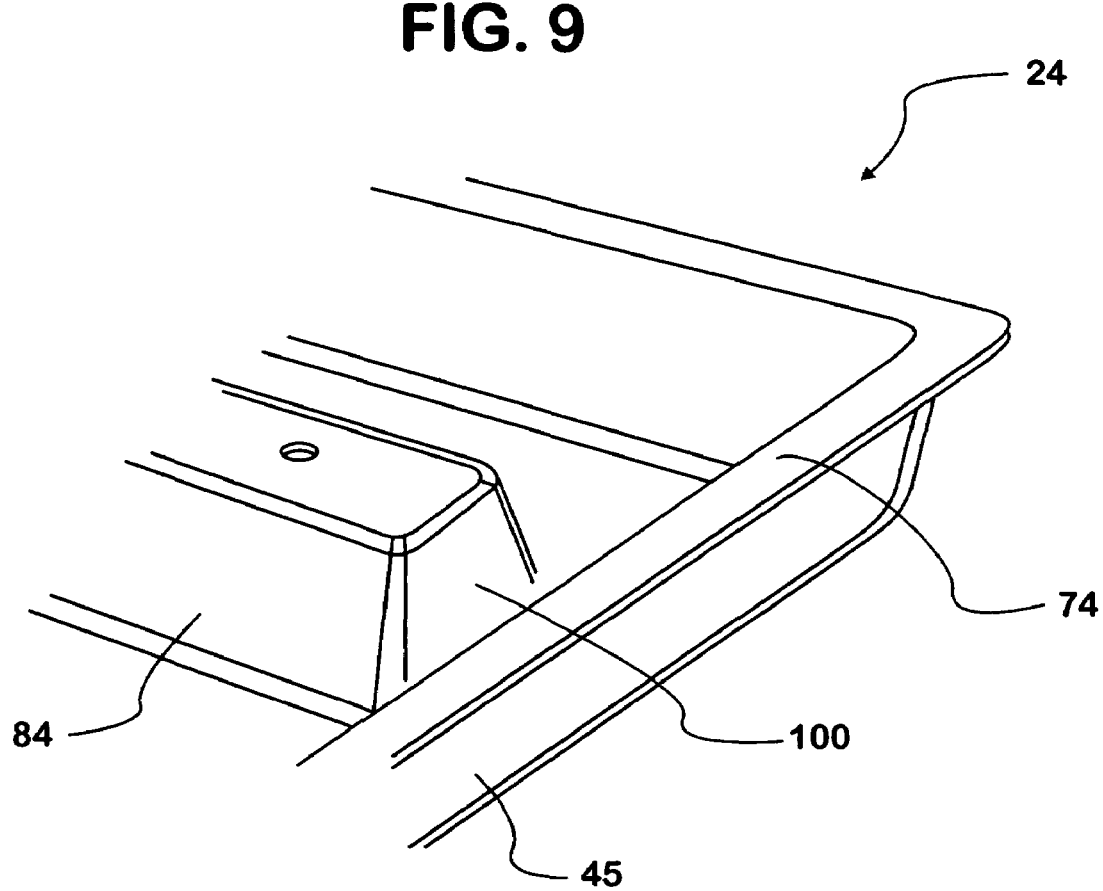
FIG. 9 is a perspective view of a channel defined by a pan dike and an exterior perimeter wall.

Channels between fuel storage depressions in pan 24 are preferably located along perimeter wall 45 which leaves larger sections of the wall, particularly along the side of the vehicle, uninterrupted and smooth. FIG. 9 illustrates location of a channel 100 between dike 84 and a section of perimeter wall 45 which leaves the perimeter wall uninterrupted.

Figure 10:
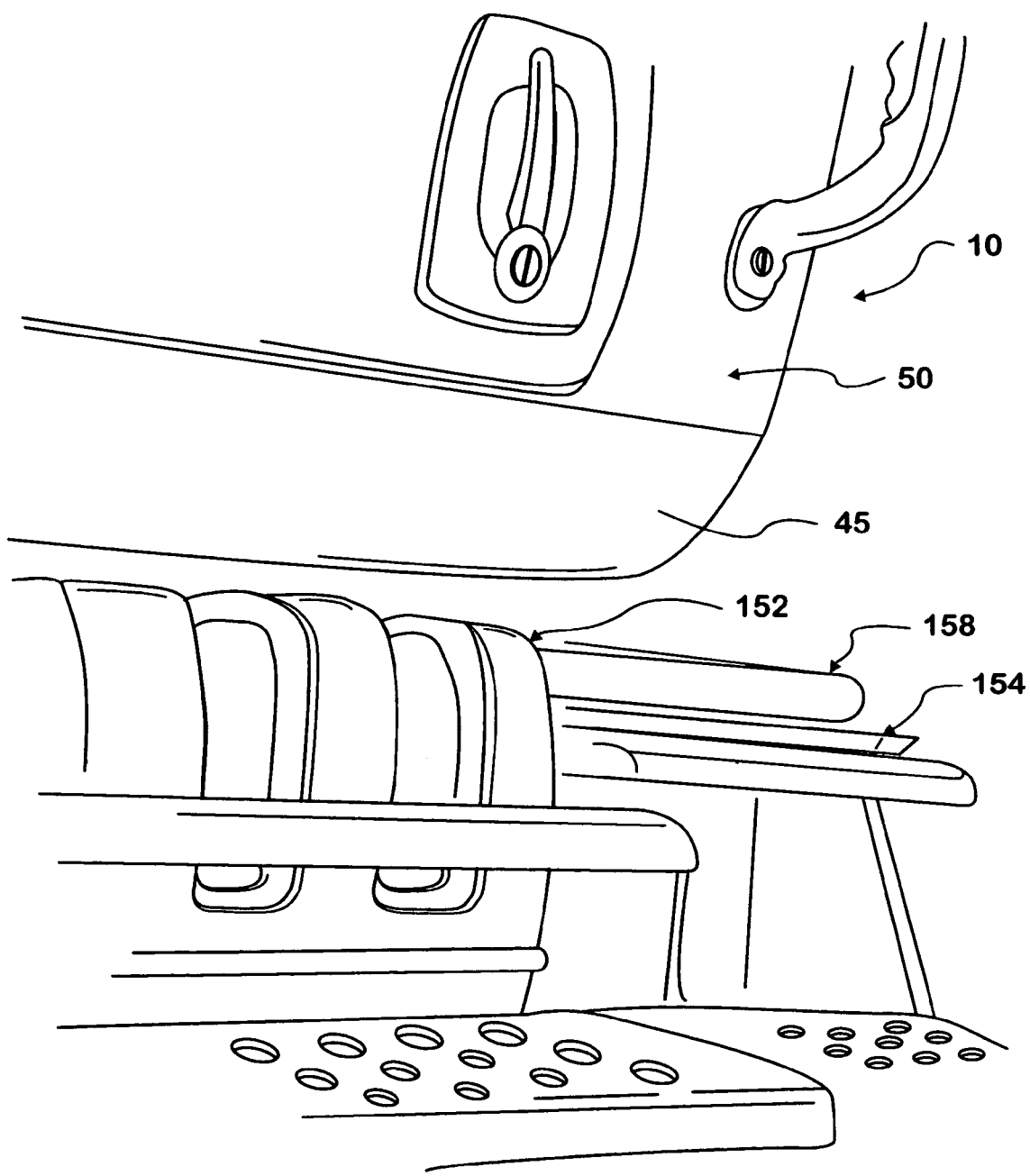
FIG. 10 is a perspective view of a cab side illustrating positioning of the cab floor fuel tank of the invention.
Figure 12:
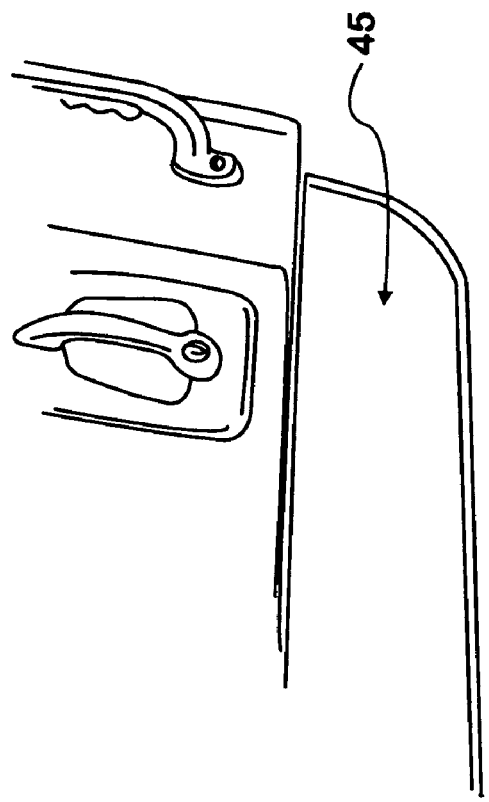
FIGS. 11 and 12 illustrate substitution of the cab floor fuel tank for a tractor modesty panel.
Figure 11:
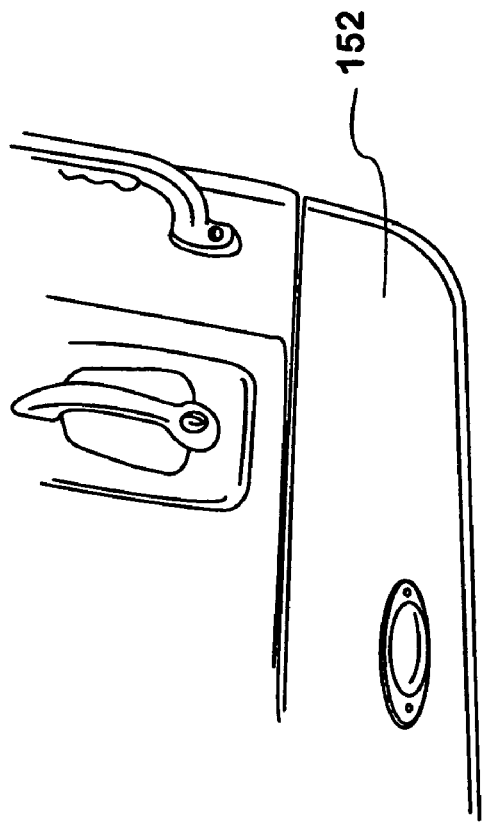

Referring to FIG. 10, some of the modifications which are possible for a truck tractor 10 after removal of fuel storage to an under cab position are illustrated. A deck plate 158 is visible under driver side 50 and perimeter wall 45 of fuel tank 18. Outward from deck 18 is a battery box 152. The removal of the cylindrical fuel tank allows the position of the battery box 152 to be standardized, since its location no longer depends upon the size of cylindrical fuel tank used on the vehicle. Located aft of battery box 152 is a rear cab access step 154. FIGS. 11 and 12 illustrate how perimeter wall 45 substitutes for a modesty panel 152 formerly installed on the vehicle for cosmetic reasons.

Figure 13:
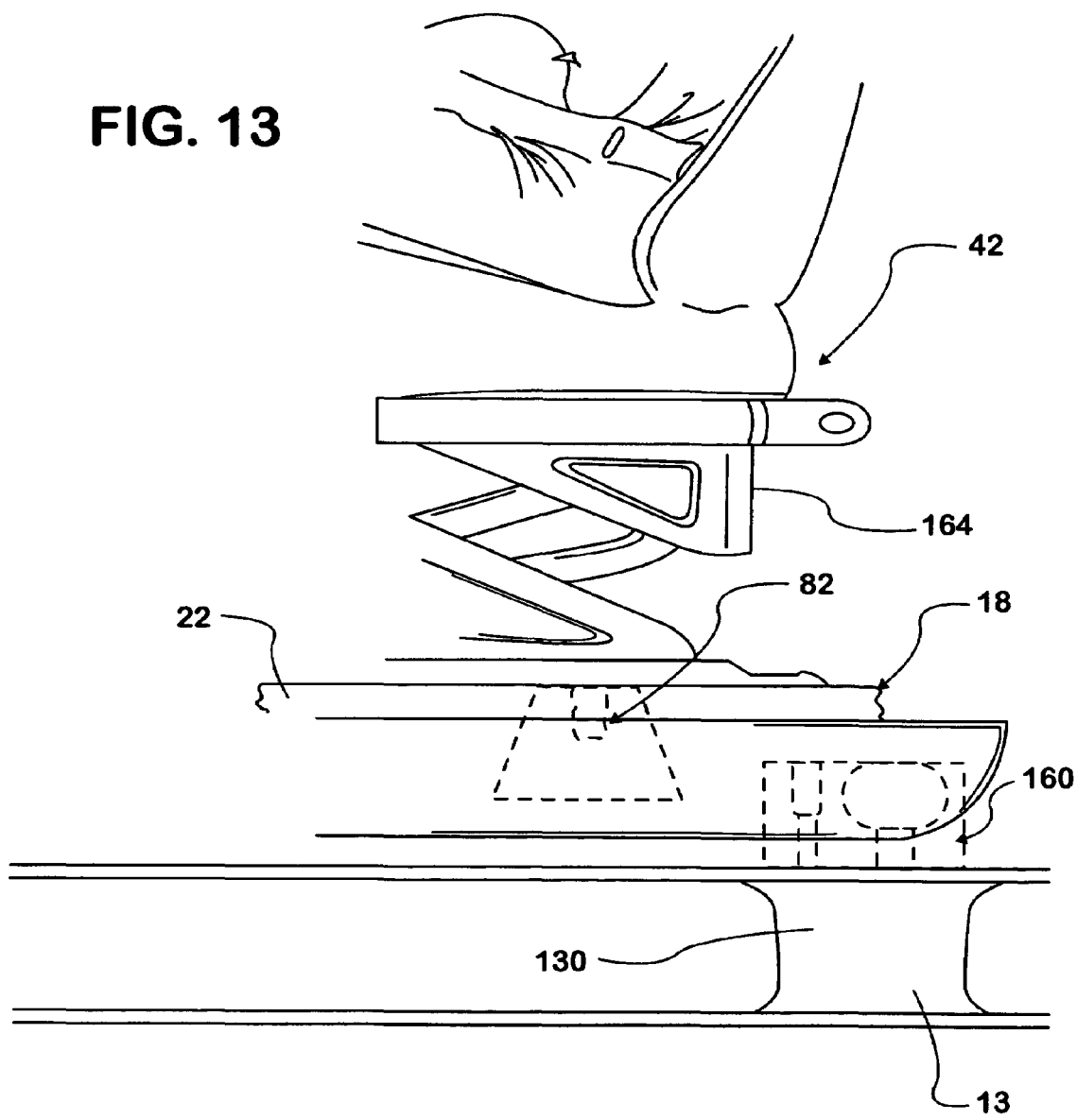
FIG. 13 is a side elevation of suspensions for a cab floor fuel tank and a driver seat mounted on the cab floor fuel tank.

FIG. 13 illustrates disposition of a driver's seat 42 supported on fuel tank 18. Fuel tank 18 is preferably supported along its rear edge on a combination air spring, shock dampening suspension element 160. Seat 42 has an undercarriage 164 which is mounted on deck 22 over dike 82, which carries the weight of the seat. Suspension element 160 fits into a non-depressed portion of fuel tank 18, and rests on a cross member 130 between the frame rails 13 and 12.

The invention provides simplification in tractor construction by allowing the replacement of cylindrical, strap on fuel tanks and cab floor sub-assemblies by use of a single, dual purpose, sub-assembly. No sacrifice in structural integrity of the cab should result. The fuel tank itself is well protected. Squeaks associated with rotation of cylindrical fuel tanks within their straps should be eliminated, contributing to creating an impression of a solidly built tractor cab. Fuel sloshing should be substantially eliminated improving vehicle handling. The need for fuel balancing between two outwardly disposed tanks is eliminated and thus the need for connections between the tanks and any pumps or check valves used in a balancing system is also eliminated.

While the invention is shown in only one of its forms, it is not thus limited but is susceptible to various changes and modifications without departing from the spirit and scope of the invention.

What is claimed is:

1. A truck tractor comprising:
  a frame;
  a cab supported suspended on the frame; and
  a fuel tank joined to and forming the bottom of the cab, the fuel tank including,
    a cab floor having a bottom surface forming the top of the fuel tank,
    a tank pan attached to the bottom surface of the cab floor, the tank pan including a plurality of depressions defined by dikes and a perimeter pan wall, channels interconnecting the depressions and a drain from one of the depressions;

a perimeter wall defining the outer rim of the tank pan, the perimeter wall having flanged upper surface for bonding to the undersurface of the cab floor; and the dikes supporting the undersurface of the cab floor being arranged in a bidirectional pattern thereby providing rigidity to the cab floor and arranged to provide mounting points for furnishings to be installed in the cab.

2. The truck tractor as set forth in claim 1, further comprising:

a perimeter wall defining the outer rim of the pan, the perimeter wall having a flanged upper surface for bonding to the undersurface, of the cab floor; and the dikes supporting the undersurface of the cab floor to provide rigidity to the cab floor, the dikes being arranged in a pattern to provide mounting points for accessories in the cab.

3. The truck tractor as set forth in claim 1, further comprising:

bracing elements disposed under the dikes.

4. The truck tractor as set forth in claim 3, further comprising:

a plurality of foam fillers, one disposed in each depression of the tank pan.

5. The truck tractor as set forth in claim 4, further comprising:

a plurality of interconnections between the depressions through the dikes.

6. The truck tractor as set forth in claim 5, further comprising:

a drain from a lowest one of the depressions.

7. The truck tractor as set forth in claim 6, wherein the tank pan is tilted to place the lowest point adjacent one of the leading edge and the trailing edge.

8. The truck tractor as set forth in claim 7, further comprising:

openings through the leading portion of the cab floor and the tank pan.

9. A vehicle substructure comprising:

a floor section;

a support frame disposed beneath and adjacent to the floor section, the support frame including a stamped pan having a raised, rectangular perimeter wall with an upper edge in contact with the floor section and defining a plurality of integral support ribs within the raised, rectangular perimeter wall each of which integral support ribs is orthogonal with respect to a side of the perimeter wall and which brace the floor section and which are located for support of and allow attachment of permanent furnishings to be installed in the cab;

reservoirs formed in the stamping stamped pan between and defined by the support ribs and the raised, rectangular perimeter wall; and channels through the support ribs interconnecting the reservoirs.

10. The vehicle substructure as set forth in claim 9, further comprising:

a drain from one of the reservoirs; and a return line into one of the reservoirs.

11. The vehicle substructure as set forth in claim 10, further comprising:

foam inserts in each of the reservoirs.

12. The vehicle substructure as set forth in claim 11, further comprising:

reinforcing brackets welded under the stamped pan into the support ribs.

* * * * *